United States Patent Office 3,110,798
Patented Nov. 12, 1963

3,110,798
SUBMERGED ARC WELD METAL COMPOSITION
Louis K. Keay, Jr., Glen Moore, Pa., assignor to Lukens Steel Company, Coatesville, Pa., a corporation of Pennsylvania
No Drawing. Filed July 10, 1959, Ser. No. 826,141
4 Claims. (Cl. 219—73)

The present invention relates to an arc weld metal composition for submerged arc welding and is a continuation-in-part of my application Ser. No. 686,040, filed September 25, 1957, now abandoned.

A principal object of the invention is to provide a weld having a high impact strength at low temperatures even following stress relieving heat treatment. A weld of this composition not only retains its tensile strength but also shows little, if any, deterioration as regards impact strength even at very low temperatures and following stress relieving heat treatment. The weld of this invention shows an unexpected result over prior art submerged arc type welds, both as-welded and stress-relieved. As applied by the inert gas shielded processes of the prior art, it shows an improvement not in as-deposited properties, but in properties after stress relief. The composition applied by the coated stick electrode method is different from, but shows no advantage over prior art commercial compositions.

Another object is the provision of a weld metal composition which is suitable for welding heavy plates using the submerged arc process. For instance, submarine construction involves heavy gauge plates for which the submerged arc process is more economical than the presently approved manual or inert gas procedures. In addition there is a potential demand for a weld of this type by private pressure vessel builders.

A further object is the provision of a weld composition from which a weldment may be produced having a tensile strength of 90,000 to 135,000 p.s.i. at temperatures of 40° below zero Fahrenheit and lower, following the step of stress-relieving.

A further object is the addition of copper in a low alloy steel weld to produce a new and unexpected result, namely to improve the impact strength.

The addition of copper to wrought low alloy steels presents no novelty in this art. It may occur as a tramp element up to about 0.35%. Copper is added to some alloys up to about 1.00% to confer atmospheric corrosion resistance. It is added to other steel plate and sheet materials to give a precipitation hardening effect. Copper has also been added to highly alloyed chrome-nickel-molybdenum stainless steel type alloys to give added resistance to corrosion by sulfuric acid. Necessarily, therefore, it has been added to the weld metals for such stainless steels. However, copper in a low alloy steel weld metal has been commonly regarded as an undesirable impurity. Its deliberate addition to improve impact strength at temperatures of 40° minus and below Fahrenheit following stress relieving heat treatment is a new use in the art of submerged arc welding, and for the construction of pressure vessels.

Another object is to provide a welding composition in which the several alloying elements are balanced to produce thereby good impact properties at low temperatures with tensile strengths of between 85,000 to 135,000 p.s.i.

A weld having the following composition ranges possesses all of the above qualities of high tensile strength and ductility properties following stress relieving treatment at temperatures of 40° minus Fahrenheit and below:

| Element | Range |
|---|---|
| C | .03/.20 |
| Mn | 1.00/2.00 |
| P | .04 max. |
| S | .05 max. |
| Si | .20/.80 |
| Ni | .90/2.25 |
| Cr | .20/.72 |
| Cu | .35/1.00 |
| Mo | .15/.45 |
| V | .10 max. |
| Al | .01/.08 |
| Ti | .002/.20 |

Following is a list of specific weld metal compositions meeting the 85,000 p.s.i. to 135,000 p.s.i. tensile strength and having adequate ductile properties at low temperatures in quenched and tempered steels:

| Arc Welding Composition | C | Mn | Si | Ni | Cr | Mo | Cu | V | Al | Ti |
|---|---|---|---|---|---|---|---|---|---|---|
| A | .10 | 1.25 | .35 | 1.60 | .72 | .18 | .37 | .002 | .01 | .002 |
| B | .10 | 1.03 | .53 | 1.95 | .40 | .28 | .73 | .001 | .015 | .003 |
| C | .07 | 1.15 | .68 | 1.81 | .24 | .31 | .65 | .003 | .024 | .003 |

The following characteristics were observed:

| Weld | Temp., °F. | Impacts As-Welded (ft.-lbs.) | Impacts Stress-Relieved (ft.-lbs.) |
|---|---|---|---|
| A | −60 | 19, 16, 13 | 17, 13, 15 |
|   | −80 | 16, 17, 19 | 15, 13, 14 |
|   | −100 | 15, 15, 15 | 16, 17, 17 |
| B | −60 | 20, 18, 17 | 18, 19, 20 |
|   | −80 | 15, 13, 15 | 11, 15, 19 |
|   | −100 | 10, 14, 8 | 13, 11, 15 |
| C | −40 | 37, 35, 35 | --- |
|   | −60 | 21, 22, 21 | 18, 17, 18 |
|   | −80 | 17, 18, 22 | 15, 15, 15 |
|   | −100 | 17, 17, 16, 16 | 15, 11, 14 |

Composition A above, which is characterized by its high Mn, high Ni, and high Cu as compared with others of its prior art, exhibited very good properties, which properties were confirmed by a checking of the weld deposit made from a different but similar chemical analysis.

The copper addition is beneficial in providing a weld whose toughness at low temperatures is present to an unexpected degree. Further, it makes necessary less nickel while still providing ductility. Also, it contributes uniquely to an improved microstructure in the weldment.

It appears that a good weld metal from the standpoint of high impact strength and toughness depends on the mutual effects of several alloying elements present in any arc weld metal composition containing alloying elements such as set out hereinafter. Speaking generally, one element, such as copper, when in a certain percentage or range percentage may form a good weld having the proper characteristics when used with other elements each of different percentages or ranges, i.e. to produce a weldment of high tensile strength at low temperatures, following stress relieving heat treatment. However, when this same element, say copper, of the same percentage or range percentages, is used with still other elements of different percentages or range percentages, or even the same elements but having different percentages or range percentages, it may produce a weld that entirely lacks the improved qualities of the first named weld, namely, this second weld would lack after stress relieving heat treatment a high tensile strength of 85,000 to 135,000 p.s.i. at low temperatures of, say minus 40° Fahrenheit and below. It appears that a good weld from the standpoint of having high tensile strength of the order of that stated above at low temperatures of −40° F. and below depends upon the mutual effects of the several alloying elements present and their percentages.

It was found that the weld metal of this invention, after welding, was free of cracks and porosity, and was stronger than the steel to which it was welded, as shown by a tensile test across the weld. Such weld metal was ductile, as shown by guided bend tests made in accordance with the ASME Code for Boilers and Unfired Pressure Vessels, section IX. The weld metal had standard (ASTM) Charpy V-notch impact values of 20 foot-pounds at −60° F. and 17 foot-pounds at −100° F.

The present invention includes a weld metal composition as well as a welding wire composition, since alloying elements may be added to the weld metal through the flux. The wire or weld metal composition could also be used in manual coated electrode welding.

The welding wire may be used for different steels on the same strength level, the composition being varied to compensate for dilution by the different types of steels. Moreover, the wire may be used with any one of a number of different kinds of commercial fluxes, which result in either a gain or loss in certain elements.

The wire may be manufactured from compositions that are killed with aluminum in quantities up to 0.08%, titanium in quantities up to 0.20%, or both, and in addition the melt may be treated with rare earth metals.

The wire when used with proper fluxes and energy input conditions will develop 100 percent joint efficiency and good ductility in normalized and tempered or quenched and tempered steels in the tensile strength range of 85,000 to 135,000 p.s.i. Assuming that proper welding procedures are used, the wire or weld metal composition will have a good sub-zero notch toughness either as welded or stress relieved.

It will be understood that the above first named composition, and a composition within the above ranges, could be produced by introducing into the weld one or more of the elements named by using a flux containing such elements. In other words, the wire may lack one or more of the elements noted above provided the element is introduced in the flux.

The above description discloses several methods which may be used in practicing the invention, and specific language has been employed in describing the same. It will, nevertheless, be understood that no limitations of the scope of the invention are thereby contemplated, and that various alterations and modifications in said inventive steps may be used such as would occur to one skilled in the art to which the invention relates.

I claim:

1. In the process of submerged arc welding, the deposition of weld metal having a composition as follows: aluminum .01 to .08%, carbon .03 to .20%, chromium .20 to .72%, copper .35 to 1.00%, manganese .45 to 2.00%, molybdenum .15 to 1.00%, nickel .90 to 2.25%, silicon .20 to .80%, titanium .002 to .20%, up to .10% vanadium, .04% phosphorus, and .05% sulphur, and the balance iron with incidental impurities.

2. In the process of submerged arc welding, the deposition of weld metal composed of percentages substantially as follows:

| C | Mn | Si | Ni | Cr | Mo | Cu | V | Al | Ti |
|---|---|---|---|---|---|---|---|---|---|
| .10 | 1.25 | .35 | 1.60 | .72 | .18 | .37 | .002 | .01 | .002 | and the balance iron with incidental impurities.

3. In the process of submerged arc welding, the deposition of weld metal composed of percentages substantially as follows:

| C | Mn | Si | Ni | Cr | Mo | Cu | V | Al | Ti |
|---|---|---|---|---|---|---|---|---|---|
| .10 | 1.03 | .53 | 1.95 | .40 | .28 | .73 | .001 | .015 | .003 | and the balance iron with incidental impurities.

4. In the process of submerged arc welding, the deposition of weld metal composed of percentages substantially as follows:

| C | Mn | Si | Ni | Cr | Mo | Cu | V | Al | Ti |
|---|---|---|---|---|---|---|---|---|---|
| .07 | 1.15 | .68 | 1.81 | .24 | .31 | .65 | .003 | .024 | .003 | and the balance iron with incidental impurities.

References Cited in the file of this patent

UNITED STATES PATENTS

| 2,443,932 | Roff et al. | June 22, 1948 |
| 2,565,953 | De Gaspari et al. | Aug. 28, 1951 |
| 2,621,278 | Muller | Dec. 9, 1952 |
| 2,679,454 | Offenhauer | May 25, 1954 |
| 2,823,992 | Bolkcom et al. | Feb. 18, 1958 |

OTHER REFERENCES

Chipman: Transactions of ASM, volume 22, 1934, pages 385–446 (pages 430–431 particularly relied on), published by the American Society for Metals, Cleveland, Ohio.

Welding Journal, volume 33, No. 5, May 1954, pages 251s–256s, published by the American Welding Society, Easton, Pa.